United States Patent Office 2,987,777
Patented June 13, 1961

2,987,777
PROCESS OF PRODUCING SYNTHETIC MICA
Wallace W. Beaver, South Euclid, and John G. Theodore, Willowick, Ohio, assignors to The Brush Beryllium Company, Cleveland, Ohio, a corporation of Ohio
No Drawing. Filed Apr. 27, 1959, Ser. No. 808,960
18 Claims. (Cl. 18—59.2)

This invention relates to synthetic mica and particularly to an improved process of making economically useful compositions, bodies, and articles of such micaeous material.

Naturally occurring micas are silicate compositions and, as a group, have similar crystallorgraphic and physical properties, and essentially all of them contain hydroxyl groups in the molecules.

The manufactured micas with which the present invention is concerned are synthetic micas in which fluorine replaces the hydroxyl groups of the natural micas. Hereinafter, these fluorine containing synthetic micas are referred to as fluorophlogopite micas and are characterized by the formula:

$$XY_{21/2} \text{ to } 5Si_mO_{10}F_n$$

wherein:

X consists of at least one cation selected from the group consisting of alkali metals, alkaline earth metals, and combinations and mixtures thereof;

Y consists of at least one cation selected from the group consisting of magnesium, aluminum, lithium, and boron, and combinations and mixtures thereof;

$m$ varies from 2 to 4, and
$n$ varies from 1 to 3.

The specific fluorophlogopite mica in which X is potassium and Y is a combination of magnesium and aluminum, in accordance with the formula $KMg_3AlSi_3O_{10}F_2$, is referred to herein as synthetic normal fluorophlogopite.

Naturally occurring mica has been extensively used for electrical and thermal applications because of its well-known dielectric and refractory properties but, especially in the case of electric application, these uses have been limited by the fact that the natural materials do not lend themselves to fabrication by machining or otherwise in the various forms and shapes that may be desired.

It has been demonstrated that the constituent ingredients of micaceous composition can be reacted in the solid state and processed in a manner to produce synthetic bodies having the characteristic dielectric and thermal refractory properties of natural mica. We have found that such synthetic bodies can be made which are accurately machinable to desired form for use. This opens the possibility of producing such accurately formed synthetic bodies in sheet or plate form for dielectric purposes and in block form for thermal insulating and refractory purposes in place of block talc.

With the above-noted possibilities in view, it is an object of this invention to provide an economical and practcal process for the preparation of bodies of fluorophlogopite mica, of useful shapes and sizes.

It is a further object of this invention to provide various fluorophlogopite mica products having dielectric properties which render the products especially useful for electrical insulating purposes.

Another object of the invention is to provide fluorophlogopite mica bodies having desirable dielectric properties and which can be accurately machined to specified forms.

It is still another object of this invention to provide fluorophlogopite mica bodies which are well adapted for use as substitutes for block talc.

For the accomplishment of the above noted objects, and others which may be apparent from the following description, the process constituting our invention preferably comprises the steps of:

(1) Providing constituent materials or ingredients which, when reacted in combination, will produce fluorophlogopite mica of predetermined composition;

(2) Intimately mixing, in a finely divided state, a fluorine producing agent and stoichiometric amounts of the selected ingredients;

(3) Compacting the mixed materials at room temperature within a pressure range providing, at the minimum pressure of the range, compacts capable of being handled without disintegrating and, at the maximum pressure of the range, compacts of the minimum porosity capable of releasing gases formed in the compacts during subsequent reaction of their constituent ingredients;

(4) Heating the compacts so formed to effect complete reaction of their constituent ingredients while the compacts remain in solid and porous state, thereby producing fluorophlogopite mica.

(5) Pulverizing the reacted fluorophlogopite mica compacts.

(6) Compacting the pulverized fluorophlogopite mica and subjecting it to hot pressing at a temperature, at a pressure, and for a time, capable of giving the product a predetermined density.

Various ingredients are capable of use in our process, dependent on the type of fluorophlogopite mica desired, but the presence, in the composition, of fluorine within certain herein disclosed proportions appears to be necessary for attainment of preferred electrical and thermal properties. Ingredients containing water of hydration should not be used as its volatilization may cause fluorine deficiency and accompanying formations of forsterite which causes spalling and adversely affects machining qualities of the mica formed. On the other hand, we have found that an excess of fluorine beyond the proportions herein disclosed causes formation of vitreous material which adversely affects machinability of the product. For example, the use of such an excess of fluorine to compensate for fluorine losses during heating may cause formation of objectionably large amounts of magnesium or other fluorides with resultant deleterious effects on the electrical properties, machinability, and thermal stability of the product. The presence of sodium impurities in the ingredients also tends to cause glass formation and should be avoided.

To reduce the possibility of these objectionable results, it is preferable that the selected ingredients be used in stoichiometric amounts in the practice of our process.

In the practice of the process comprising the six steps hereinabove enumerated, the treatment will naturally vary with the nature of the ingredients selected to produce a desired type of fluorophlogopite mica. For example, in compacting the ingredients to be reacted, a pressure which may be sufficient in one case may, in another case, be insufficient to give the compact the strength desirable for the subsequent steps of the process. Similarly, the pressure suitable to provide the degree of porosity of the compact needed to permit escape of gases during the reaction step will vary with the particle size distribution of the ingredients compacted.

By way of further explanation of the invention, specific preferred applications of the process will first be described, followed by additional examples.

EXAMPLE I

| Ingredients: | Parts by weight |
|---|---|
| $K_2SiF_6$ | 17.131 |
| $Al_2O_3$ | 12.137 |
| $K_2CO_3$ | 5.376 |
| $SiO_2$ | 37.373 |
| MgO | 28.656 |

In the foregoing example of the production of normal fluorophlogopite mica, all of the ingredients, including the fluorine producing agents, are in stoichiometric proportions.

The specified stoichiometric parts by weight of the above ingredients, which are of −200 mesh particle size, were combined in a Patterson-Kelly twin-shell blender and intimately mixed, and then mass compacted at room temperature in a die with a pressure of about 5000 p.s.i. The compact was then heated in a resistance type electric furnace for about 15 hours at a temperature of about 1150° C. to effect complete reaction of the compacted ingredients while they remained predominantly in the solid state. The reacted mass was then pulverized and, after being compacted at room temperature, was hot pressed at a temperature of about 1250° C. and at about 1000 p.s.i. in a mold having a cylindrical cavity.

The density and the electrical properties of the produced fluorophlogopite which, as defined above, is a normal fluorophlogopite with the formula $KMg_3AlSi_3O_{10}F_2$, as determined on a Boonton Q-Meter which employs the resonant-rise method at one megacycle and at room temperature, were:

| Dielectric Constant | Power Factor × 10⁻³ | Loss Factor × 10⁻³ | Avg. Density (g./cc.) |
|---|---|---|---|
| 5.89 | 0.216 | 1.275 | 2.78 |

The reaction effected is believed to take place in accordance with the following equation:

$$2K_2SiF_6 + K_2CO_3 + 3Al_2O_3 + 18MgO + 16SiO_2 \rightarrow 6KMg_3AlSi_3O_{10}F_2 + CO_2$$

In the following and second example, which is for the production of a boron fluorophlogopite mica, all of the ingredients, including the fluorine producing agent, are in stoichiometric proportions.

EXAMPLE II

Ingredients: Parts by weight
- $K_2SiF_6$ ---- 16.709
- $K_2CO_3$ ---- 5.242
- $SiO_2$ ---- 36.45
- $MgO$ ---- 27.948
- $H_3BO_3$ ---- 14.07

The procedure of Example I was followed in preparing boron fluorophlogopite mica from the above stoichiometric parts by weight of the specified ingredients.

The reaction is believed to be represented by the following equation:

$$2K_2SiF_6 + K_2CO_3 + 18MgO + 6H_3BO_3 + 16SiO_2 \rightarrow 6KMg_3BSi_3O_{10}F_2 + CO_2 + 9H_2O$$

The density and electrical properties of the finished product as determined by the procedure employed in Example I were:

| Dielectric Constant | Power Factor ×10⁻³ | Loss Factor ×10⁻³ | Avg. Density (g./cc.) |
|---|---|---|---|
| 5.85 | 1.302 | 7.55 | 2.70 |

It will be understood that the specific examples that have been given are offered by way of illustration and for the purpose of explanation, and that our process can advantageously be used for the production of a wide variety of fluorophlogopite mica products. The fact that various ions and combinations thereof can be provided in the mica product by selecting corresponding reactants makes a very large number of such products practically available through use of our improved process.

As will be apparent to those familiar with the subject matter under consideration, particularly in view of the wide range of compositions involved, the reaction and hot pressing temperatures, as well as the cold pressing and hot pressing pressures, will best be determined by trial for specific mica compositions and particular sizes and shapes of the fluorophlogopite mica bodies to be produced. Ordinarily, the pressures for cold compacting of the mixed ingredients will be within the range of about 1000 p.s.i. to 10,000 p.s.i., and the hot pressing of the reacted material will be at pressures ranging from about 500 p.s.i. upward to values required to secure a desired density of the product. The reacting of the compacted ingredients and the hot pressing of the reacted material will ordinarily be at temperatures within the range of about 900° C. to 1300° C. Obviously the temperature and pressure employed in the hot pressing, as well as the duration of the treatment to secure a product of a particular density, are more or less interdependent.

While all of the six steps of our process which have been described are essential to attain its full advantages, substantial advantages of the invention can be secured by the use of sub-combinations consisting of the first four steps and the first five steps, respectively. Products prepared by the four-step procedure naturally do not attain the density secured by the full process, but their strength and electrical properties are adequate for a variety of applications. They are especially useful as substitutes for block talc.

Mica blocks made by the four-step treatment are characterized by some shrinkage which may cause cracks, similar to those found in natural block talc, but such mica blocks can be used advantageously in a manner comparable to talc by machining smaller bodies from the portions of the blocks free of cracks.

Compacts of most of the micaceous compositions disclosed can be machined easily, have good electrical and thermal insulating properties, and unlike block talc can be made to a variety of sizes and shapes. Since natural talc bodies must be heat treated to stabilize their dimensions and develop their electrical properties and can be machined only by grinding in the heat-treated state, it has been customary to machine the natural talc bodies to a size which allows for shrinkage during the necessary subsequent heat treatment. As such shrinkage can be only roughly estimated, our improved material, which can be machined in the heat-treated state to close dimensions, is distinctly superior to natural block talc for manufacture as precision, dimensionally stable, dielectric and refractory components.

However, because of the variation in composition and properties capable of realization with our fluorophlogopite mica, products distinctly superior to block talc also can be made by the four-step treatment. Examples of such fluorophlogopite mica are barium-lithium mica $$(BaMg_2LiAlSi_3O_{10}F_2)$$

which has been produced in large blocks by the said treatment and is characterized by shrinkage without cracking, and tetrasilicic mica ($KMg_{2.5}Si_4O_{10}F_2$) which can be formed without appreciable shrinkage of the reacted compacts. Such porous micas can be made in a variety of desired sizes and shapes which have adequate insulating properties for many purposes.

Production of another fluorophlogopite mica of the barium-lithium type may be taken as an example of the four-step procedure:

EXAMPLE III

Ingredients: Parts by weight
- $SiO_2$ ---- 21.11
- $MgO$ ---- 7.10
- Dehydrated kaolin ---- 19.52
- $BaCO_3$ ---- 34.8
- $Li_2CO_3$ ---- 6.5
- $MgF_2$ ---- 12.45

The specified stoichiometric parts by weight of the above ingredients, which are of −200 mesh particle size, were mixed in a twin-shell blender, and the mixed mass was compacted in a die at room temperature at about 5000 p.s.i. The compact was then heated in a resistance type furnace for about 15 hours at a temperature of about 1075° C. until reaction was complete, the reaction being represented by the following equation:

$2BaCO_3+2MgO+2MgF_2+Al_2O_3.2SiO_2+Li_2CO_3$
$+4SiO_2 \rightarrow 2BaMg_2LiAlSi_3O_{10}F_2+3CO_2$ The barium-lithium fluorophlogopite mica block was then machined to a cylindrical form. The density and electrical properties of the product, $BaMg_2LiAlSi_3O_{10}F_2$, as determined on a Boonton Q-Meter employing the resonant-rise method at one megacycle and at room temperature were as follows:

| Dielectric Constant | Power Factor ×10⁻³ | Loss Factor ×10⁻³ | Avg. Density (g./cc.) |
|---|---|---|---|
| 6.63 | 0.677 | 4.49 | 2.87 |

The powdered material produced by the five-step procedure previously mentioned is substantially free of vitreous material and constitutes a new and improved micaceous product of marked commercial utility. A distinctive superiority of the five-step product lies in its greater density, and superior dielectric properties when hot-pressed. For example, in comparing hot-pressed bodies of normal fluorophlogopite mica formed by reaction of uncompacted ingredients, and by our process, respectively, the results of hot pressing at 1000 p.s.i. and 1250° C. to maximum density were 2.69 g./cc. for the product reacted without compacting and 2.78 g./cc. for our product reacted after compaction. This indicates the superior coherent properties of our product and its superiority as a refractory binder for materials such as silicon carbide.

Our process is particularly distinguished by the manner in which the intimately mixed ingredients are reacted to produce the desired micaceous body, the procedure herein disclosed having been made possible by our discovery that it is possible to form compacts of the ingredients capable of being handled without disintegrating and being, at the same time, sufficiently porous to permit escape of gases formed during reaction of the ingredients.

By first forming the constituent ingredients into compacts in the manner herein described and then heating the compacts to effect reaction, notable economic advantages also are realized in comparison with previously proposed procedures in which the mixtures of pulverized ingredients were poured into saggers or containers which were then closed, placed in a furnace, and heated to effect reaction of the mixture. We have found that the expensive saggers so employed frequently crack and burst and have to be replaced and that their contents adhere to and react with the sagger walls, with resultant waste of ingredients which must be compensated for by providing originally an excess of the ingredient which will be wasted. This is a serious expense item especially in the case of the fluorine producing agent. In contrast with this, the handleable compacts in our procedure can be loaded directly into the furnace and even stacked one upon another in close arrangement with very large saving of space over the use of saggers and uncompacted material, and with a resultant increase of furnace capacity, as well as a saving in the original and upkeep costs of the saggers themselves.

A further advantage of our process is the elimination from the product of vitreous material which adversely affects the machinability and the electrical properties of the product. Another advantage is the saving resulting from using the preferred stoichiometric amounts, rather than an excess of expensive fluorine-containing salts. In addition, the reacted compacts of our process, while more porous than the hot-pressed final product, nevertheless can be machined and have sufficient density for various uses, as previously explained.

Some of the above, and some additional, examples of fluorophlogopite micas and tabulations of data illustrating characteristics thereof are set forth below. These examples include ingredients in non-stoichiometric proportions as well as in stoichiometric proportions, the latter being included in the examples for convenience in comparison.

The procedures of Example I were followed in all instances. For convenience in reference, each composition used in the tables below is correspondingly lettered in each table in which it appears.

*Table I*

NORAML FLUOROPHLOGOPITE MICA COMPOSITION INGREDIENTS (Ingredients specified in parts by weight and adjusted for purity)

[Example D is a duplicate of Example I presented for convenience of comparison]

| Example | A | B | C | D | E | F | G |
|---|---|---|---|---|---|---|---|
| $K_2SiF_6$ | 12.904 | 15.445 | 16.289 | 17.131 | 18.813 | 21.324 | 25.48 |
| $K_2CO_3$ | 8.097 | 6.461 | 5.917 | 5.376 | 4.293 | 2.676 | |
| MgO | 28.926 | 28.848 | 28.827 | 28.656 | 28.753 | 28.680 | 28.41 |
| $SiO_2$ | 38.707 | 37.905 | 37.639 | 37.373 | 36.843 | 36.051 | 34.74 |
| $Al_2O_3$ | 12.189 | 12.157 | 12.147 | 12.137 | 12.116 | 12.085 | 12.03 |
| Fluorine stoichiometry | 25 mole percent def. | 10 mole percent def. | 5 mole percent def. | Stoichiometric. | 10 mole percent excess. | 25 mole percent excess. | 50 mole percent excess. |

*Table II*

REACTION EQUATIONS CORRESPONDING TO COMPOSITIONS OF TABLE I EXAMPLES

Example:

A. $K_2SiF_6+K_2CO_3+12MgO+11SiO_2+2Al_2O_3 \xrightarrow{\Delta} 4KMg_3AlSi_3O_{10}F_{1.5}+CO_2+\frac{1}{2}O_2$ B. $3K_2SiF_6+2K_2CO_3+30MgO+27SiO_2+5Al_2O_3 \xrightarrow{\Delta} 10KMg_3AlSi_3O_{10}F_{1.8}+2CO_2+\frac{1}{2}O_2$ C. $3\frac{1}{2}K_2SiF_6+1\frac{5}{6}K_2CO_3+30MgO+26\frac{5}{6}SiO_2+5Al_2O_3 \xrightarrow{\Delta} 10KMg_3AlSi_3O_{10}F_{1.9}+1\frac{5}{6}CO_2+\frac{1}{2}O_2$ D. $2K_2SiF_6+K_2CO_3+18MgO+16SiO_2+3Al_2O_3 \xrightarrow{\Delta} 6KMg_3AlSi_3O_{10}F_2+CO_2$ E. $11K_2SiF_6+4K_2CO_3+90MgO+79SiO_2+15Al_2O_3 \xrightarrow[1\frac{1}{2}O_2]{\Delta} 30KMg_3AlSi_3O_{10}F_{2.2}+4CO_2$ F. $5K_2SiF_6+K_2CO_3+36MgO+31SiO_2+6Al_2O_3 \xrightarrow[1\frac{1}{2}O_2]{\Delta} 12KMg_3AlSi_3O_{10}F_{2.5}+CO_2$ G. $K_2SiF_6+Al_2O_3+5SiO_2+6MgO \xrightarrow{\Delta} 2KMg_3AlSi_3O_{10}F_3$

Table III

ELECTRICAL AND PHYSICAL PROPERTIES OF NORMAL FLUOROPHLOGOPITE MICA (Specimens prepared by hot-pressing pulverized products of Table II reactions)

| Example | A | B | C | D | E | F | G |
|---|---|---|---|---|---|---|---|
| K | 5.55 | 5.43 | 6.01 | 5.89 | 5.68 | 5.78 | 6.09. |
| $PF \times 10^{-3}$ | 25.4 | 6.5 | 5.31 | 0.21 | 0.83 | 0.62 | 1.57. |
| $LF \times 10^{-3}$ | 141.0 | 35.3 | 31.9 | 1.24 | 4.70 | 3.6 | 9.55. |
| Density, g./cc | 2.52 | 2.55 | 2.82 | 2.78 | 2.72 | 2.81 | 2.76. |
| Open porosity, percent | 6.37 | 5.71 | 0.34 | 1.85 | 1.22 | 1.23 | 0.17. |
| Fluorine stoichiometry | 25 mole percent def. | 10 mole percent def. | 5 mole percent def. | Stoichiometric. | 10 mole percent excess. | 25 mole percent excess. | 50 mole percent excess. |

Table IV

PROCESS DATA ON NORMAL FLUOROPHLOGOPITE MICA REACTIONS OF TABLE II

| Example | A | B | C | D | E | F | G |
|---|---|---|---|---|---|---|---|
| Reaction temp., °C | 1,150 | 1,150 | 1,150 | 1,150 | 1,150 | 1,150 | 1,150 |
| Reaction time, hr | 15 | 15 | 15 | 15 | 15 | 15 | 15 |
| Percent of stoichiometric $F_2$ | 75 | 90 | 95 | 100 | 110 | 125 | 150 |

Table V

BORON FLUOROPHLOGOPITE MICA COMPOSITION INGREDIENTS (Ingredients specified in parts by weight and adjusted for purity)
[Example J is a duplicate of Example II presented for convenience of comparison]

| Example | H | I | J | K | L | M |
|---|---|---|---|---|---|---|
| $K_2SiF_6$ | 12.697 | 15.199 | 16.858 | 18.514 | 20.986 | 25.079 |
| $K_2CO_3$ | 7.936 | 6.333 | 5.268 | 4.207 | 2.623 | |
| $H_3BO_3$ | 14.146 | 14.111 | 14.087 | 14.064 | 14.028 | 13.970 |
| $SiO_2$ | 37.821 | 37.039 | 36.521 | 36.004 | 35.232 | 33.955 |
| MgO | 28.206 | 28.136 | 28.089 | 28.042 | 27.972 | 27.856 |
| Fluorine stoichiometry | 25 mole percent def. | 10 mole percent def. | Stoichiometric. | 10 mole percent excess. | 25 mole percent excess. | 50 mole percent excess. |

Table VI

REACTION EQUATIONS CORRESPONDING TO COMPOSITIONS OF TABLE V EXAMPLES

Example:

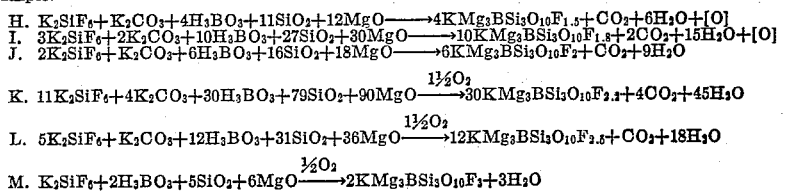

H. $K_2SiF_6 + K_2CO_3 + 4H_3BO_3 + 11SiO_2 + 12MgO \longrightarrow 4KMg_3BSi_3O_{10}F_{1.5} + CO_2 + 6H_2O + [O]$ I. $3K_2SiF_6 + 2K_2CO_3 + 10H_3BO_3 + 27SiO_2 + 30MgO \longrightarrow 10KMg_3BSi_3O_{10}F_{1.8} + 2CO_2 + 15H_2O + [O]$ J. $2K_2SiF_6 + K_2CO_3 + 6H_3BO_3 + 16SiO_2 + 18MgO \longrightarrow 6KMg_3BSi_3O_{10}F_2 + CO_2 + 9H_2O$ K. $11K_2SiF_6 + 4K_2CO_3 + 30H_3BO_3 + 79SiO_2 + 90MgO \xrightarrow{1\frac{1}{2}O_2} 30KMg_3BSi_3O_{10}F_{2.2} + 4CO_2 + 45H_2O$ L. $5K_2SiF_6 + K_2CO_3 + 12H_3BO_3 + 31SiO_2 + 36MgO \xrightarrow{1\frac{1}{2}O_2} 12KMg_3BSi_3O_{10}F_{2.5} + CO_2 + 18H_2O$ M. $K_2SiF_6 + 2H_3BO_3 + 5SiO_2 + 6MgO \xrightarrow{\frac{1}{2}O_2} 2KMg_3BSi_3O_{10}F_3 + 3H_2O$

Table VII

ELECTRICAL AND PHYSICAL PROPERTIES OF BORON FLUOROPHLOGOPITE MICA (Specimens prepared by hot pressing pulverized products of Tabel VI reactions)

| Example | H | I | J | K | L | M |
|---|---|---|---|---|---|---|
| K | 5.835 | 5.586 | 5.46 | 5.475 | 6.145 | 5.589. |
| $PF \times 10^{-3}$ | 1.305 | 0.9993 | 1.388 | 4.512 | 27.201 | 14.43. |
| $LF \times 10^{-3}$ | 7.616 | 5.582 | 7.577 | 24.70 | 167.2 | 80.63. |
| Density, g./cc | 2.731 | 2.697 | 2.704 | 2.731 | 2.693 | 2.664. |
| Open porosity, percent | 0.60 | 0.28 | 0.31 | | 0.22 | 1.42. |
| Fluorine stoichiometry | 25 mole percent def. | 10 mole percent def. | Stoichiometric. | 10 mole percent excess. | 25 mole percent excess. | 50 mole percent excess. |

Table VIII
PROCESS DATA ON BORON FLUOROPHLOGOPITE MICA REACTIONS OF TABLE VI

| Example | H | I | J | K | L | M |
|---|---|---|---|---|---|---|
| Reaction temp., °C | 975 | 975 | 975 | 975 | 975 | 975 |
| Reaction time, hr | 15 | 15 | 15 | 15 | 15 | 15 |
| Percent of stoichiometric $F_2$ | 75 | 90 | 100 | 110 | 125 | 150 |

Table IX
BARIUM FLUOROPHLOGOPITE MICA COMPOSITION INGREDIENTS (Ingredients specified in parts by weight and adjusted for purity)

| Example | N | O | P | Q | R |
|---|---|---|---|---|---|
| MgO | 16.622 | 15.422 | 13.845 | 12.678 | 10.762 |
| $BaCO_3$ | 35.870 | 35.659 | 35.382 | 35.176 | 34.839 |
| $MgF_2$ | 9.874 | 11.779 | 14.284 | 16.138 | 19.179 |
| Dehydrated kaolin ($Al_2O_3 \cdot 2SiO_2$) | 40.899 | 40.659 | 40.343 | 40.108 | 39.723 |
| Fluorine stoichiometry | 25 mole percent def. | 10 mole percent def. | 10 mole percent excess | 25 mole percent excess | 50 mole percent excess |

Table X
REACTION EQUATIONS CORRESPONDING TO COMPOSITIONS OF TABLE IX EXAMPLES Example:

N. $4BaCO_3 + 3MgF_2 + 4Al_2O_3 \cdot 2SiO_2 + 9MgO \longrightarrow 4BaMg_3Al_2Si_2O_{10}F_{1.5} + 4CO_2 + [O]$ O. $10BaCO_3 + 9MgF_2 + 10Al_2O_3 \cdot 2SiO_2 + 21MgO \longrightarrow 10BaMg_3Al_2Si_2O_{10}F_{1.8} + 10CO_2 + [O]$

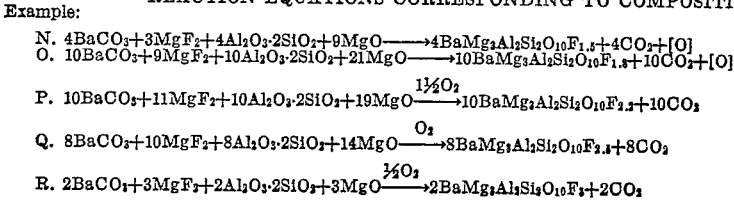

P. $10BaCO_3 + 11MgF_2 + 10Al_2O_3 \cdot 2SiO_2 + 19MgO \xrightarrow{1\frac{1}{2}O_2} 10BaMg_3Al_2Si_2O_{10}F_{2.2} + 10CO_2$ Q. $8BaCO_3 + 10MgF_2 + 8Al_2O_3 \cdot 2SiO_2 + 14MgO \xrightarrow{O_2} 8BaMg_3Al_2Si_2O_{10}F_{2.5} + 8CO_2$ R. $2BaCO_3 + 3MgF_2 + 2Al_2O_3 \cdot 2SiO_2 + 3MgO \xrightarrow{\frac{1}{2}O_2} 2BaMg_3Al_2Si_2O_{10}F_3 + 2CO_2$

Table XI
ELECTRICAL AND PHYSICAL PROPERTIES OF BARIUM FLUOROPHLOGOPITE MICA (Specimens prepared by hot pressing pulverized products of Table X reactions)

| Example | N | O | P | Q | R |
|---|---|---|---|---|---|
| K | 8.154 | 7.699 | 7.921 | 7.702 | 7.564 |
| $PF \times 10^{-3}$ | 9.120 | 0.064 | 0.126 | 0.129 | 0.399 |
| $LF \times 10^{-3}$ | 74.37 | 0.495 | 0.994 | 0.991 | 3.020 |
| Density, g./cc. | 3.523 | 3.399 | 3.452 | 3.452 | 3.452 |
| Open porosity, percent | None | None | None | None | None |
| Fluorine stoichiometry | 25 mole percent def. | 10 mole percent def. | 10 mole percent excess | 25 mole percent excess | 50 mole percent excess |

Table XII
PROCESS DATA ON BARIUM FLUOROPHLOGOPITE MICA REACTIONS OF TABLE X

| Example | N | O | P | Q | R |
|---|---|---|---|---|---|
| Reaction temp., °C | 1,150 | 1,150 | 1,150 | 1,150 | 1,150 |
| Reaction time, hr | 15 | 15 | 15 | 15 | 15 |
| Percent of stoichiometric $F_2$ | 75 | 90 | 110 | 125 | 150 |

It is apparent from the foregoing examples and data that a number of different and desirable combinations of characteristics can be obtained, depending upon the needs for the particular use of the resultant product.

This application is a continuation-in-part of our copending application Serial No. 616,584, filed October 18, 1956, and now abandoned, and entitled "A Process of Preparing Synthetic Mica and the Product Thereof."

Having thus described our invention, we claim:

1. The process of preparing fluorophlogopite mica, including the steps of providing ingredients, which, when reacted in combination, will produce a fluorophlogopite mica of predetermined composition having the following formula: $XY_{2\ 1/2}$ to $_5Si_mO_{10}F_n$, wherein: X consists of at least one cation selected from the group consisting of alkali metals, alkaline earth metals, and combinations and mixtures thereof; and Y consists of at least one cation selected from the group consisting of magnesium, aluminium, lithium, and boron, and combinations and mixtures thereof; $m$ varies from 2–4, and $n$ varies from 1–3; intimately mixing the provided ingredients in a finely divided state, compacting the ingredients at room temperature within a pressure range providing, at the minimum pressure of the range, a compact capable of being handled without disintegrating and, at the maximum pressure of the range, a compact of the minimum porosity capable of releasing gases formed in the compact during reaction of the ingredients; and heating the compact so formed within the range of about 900° C. to 1300° C., to effect complete reaction of its ingredients while the compact remains in porous and substantially solid state.

2. The process according to claim 1 wherein the reacted compact is pulverized to provide granular micaceous material.

3. The process according to claim 2 wherein the pulverized material is pressed into compacts and the resultant compacts are subjected to hot pressing to a predetermined density.

4. The process according to claim 1 wherein all of the ingredients are in stoichiometric proportions.

5. The process according to claim 1 wherein the ingredients and proportions thereof are selected to produce $KMg_3AlSi_3O_{10}F_2$.

6. The process according to claim 1 wherein X is K, Y is $Mg_3Al$, $m$ is 3, $n$ is from about 1.9 to 3.

7. The process according to claim 1 wherein all ingredients except the fluorine producing agent, are in stoichiometric proportions.

8. The process according to claim 1 wherein Y is boron.

9. The process according to claim 8 wherein X is potassium, Y is $Mg_3$ and boron, $m$ is 3; and $n$ is from about 1½ to 2.2.

10. The process according to claim 8 wherein all of the ingredients are in stoichiometric proportions.

11. The process according to claim 1 wherein all of the ingredients and proportions thereof are selected to produce $KMg_3BSi_3O_{10}F_2$.

12. The process according to claim 1 wherein X is barium.

13. The process according to claim 12 wherein Y is $Mg_3Al_2$, $m$ is 2, $n$ is from 1.6 to 3.

14. The process according to claim 1 wherein all of the ingredients and proportions thereof are selected to produce $BaMg_3Al_2Si_2O_{10}F_2$.

15. The process according to claim 1 wherein X is barium, Y is $Mg_2LiAl$.

16. The process according to claim 15 wherein all of the ingredients and proportions thereof are selected to produce $BaMg_2LiAlSi_3O_{10}F_2$.

17. The process according to claim 1 wherein all of the ingredients and proportions thereof are selected to produce $KMg_{2\,1/2}Si_4O_{10}F_2$.

18. The method according to claim 1 wherein X is $K_1$ and Y is $Mg_{2\,1/2}$.

References Cited in the file of this patent

UNITED STATES PATENTS

| | | |
|---|---|---|
| 2,675,853 | Hatch et al. | Apr. 20, 1954 |
| 2,829,061 | Comeforo et al. | Apr. 1, 1958 |

FOREIGN PATENTS

| | | |
|---|---|---|
| 574,577 | Great Britain | Jan. 11, 1946 |

OTHER REFERENCES

Roy: "Synthetic Mica, Critical Examination of the Literature," 72 pages, Pennsylvania State College, State College, Pa., 1952.

"Information About Synthetic Mica," U.S. Dept. of the Interior, Bureau of Mines, August 1951, pages 1–3.

Comeforo et al.: "J. Am. Cer. Soc." 36, 286–294 (1953).

UNITED STATES PATENT OFFICE
CERTIFICATE OF CORRECTION

Patent No. 2,987,777            June 13, 1961

Wallace W. Beaver et al.

It is hereby certified that error appears in the above numbered patent requiring correction and that the said Letters Patent should read as corrected below.

Column 1, line 23, for "$XY_{21/2}$" read -- $XY_{2\frac{1}{2}}$ --; column 2, line 68, for "$K_2S_iF_6$" read -- $K_2SiF_6$ --; line 71, for "$S_iO_2$" read -- $SiO_2$ --; column 3, line 20, for "$KM_{g3}AlS_{i3}O_{10}F_2$" read -- $KM_{g3}AlSi_3O_{10}F_2$ --; line 32, for that portion of the formula reading "$2K_2S_iF_6+$" read -- $2K_2SiF_6+$ --; same column 3, line 44, for "$S_iO_2$" read -- $SiO_2$ --; column 9, line 75, for "caton" read -- cation --.

Signed and sealed this 24th day of April 1962.

(SEAL)
Attest:

ESTON G. JOHNSON
Attesting Officer

DAVID L. LADD
Commissioner of Patents